US012737609B2

(12) United States Patent
Liu et al.

(10) Patent No.: US 12,737,609 B2
(45) Date of Patent: Sep. 15, 2026

(54) SYSTEMS AND METHODS FOR QUANTIZATION AWARE TRAINING OF A NEURAL NETWORK FOR HETEROGENEOUS HARDWARE PLATFORM

(71) Applicant: KWAI INC., Palo Alto, CA (US)

(72) Inventors: Yang Liu, San Jose, CA (US); Yongxiong Ren, San Jose, CA (US); Lingzhi Liu, San Jose, CA (US)

(73) Assignee: BEIJING TRANSTREAMS TECHNOLOGY CO. LTD., Beijing (CN)

(*) Notice: Subject to any disclaimer, the term of this patent is extended or adjusted under 35 U.S.C. 154(b) by 1101 days.

(21) Appl. No.: 17/165,849

(22) Filed: Feb. 2, 2021

(65) Prior Publication Data

US 2022/0245447 A1 Aug. 4, 2022

(51) Int. Cl.

*G06N 3/08* (2023.01)
*G06F 18/21* (2023.01)
*G06F 18/211* (2023.01)

(52) U.S. Cl.

CPC ............. *G06N 3/08* (2013.01); *G06F 18/211* (2023.01); *G06F 18/217* (2023.01)

(58) Field of Classification Search

CPC ........ G06N 3/08; G06N 3/082; G06F 18/217; G06F 18/211; G06F 18/213; G06F 18/30; G06F 18/214

See application file for complete search history.

(56) References Cited

U.S. PATENT DOCUMENTS

| | | | | |
|---|---|---|---|---|
| 11,615,304 B1 * | 3/2023 | Palkar | G06N 3/0495 | 706/20 |
| 11,676,004 B2 * | 6/2023 | Denolf | G06N 3/063 | 706/25 |
| 2019/0057305 A1 * | 2/2019 | Denolf | G06N 3/084 | |
| 2019/0391898 A1 * | 12/2019 | Vichare | G06F 9/44505 | |
| 2020/0210832 A1 * | 7/2020 | Driscoll | G06N 3/063 | |
| 2020/0218962 A1 * | 7/2020 | Lee | G06N 3/045 | |
| 2020/0302289 A1 * | 9/2020 | Ren | G06N 3/084 | |

(Continued)

OTHER PUBLICATIONS

D. Marculescu, D. Stamoulis and E. Cai, "Hardware-Aware Machine Learning: Modeling and Optimization, " 2018 IEEE/ACM International Conference on Computer-Aided Design (ICCAD), San Diego, CA, USA, 2018, pp. 1-8, doi: 10.1145/3240765.3243479. (Year: 2018).*

(Continued)

*Primary Examiner* — Luis A Sitiriche

(74) *Attorney, Agent, or Firm* — Arch & Lake LLP; Hao Tan; Shen Wang

(57) ABSTRACT

Systems and methods are provided for quantization aware training of a neural network for heterogeneous hardware platform. In the method, the system acquires hardware profiles with respect to a plurality of hardware components of a heterogeneous hardware platform. The system determines a plurality of hardware configurations based on the hardware profiles. The system acquires a set of training data and performing a quantization aware training using the training data on a network model based on the hardware configurations. The system obtains the network model with model weights for the heterogeneous hardware platform.

20 Claims, 7 Drawing Sheets

(56) References Cited

U.S. PATENT DOCUMENTS

| | | | | |
|---|---|---|---|---|
| 2021/0019630 | A1* | 1/2021 | Yao | G06N 3/045 |
| 2021/0125042 | A1* | 4/2021 | Han | G06N 3/063 |
| 2021/0224658 | A1* | 7/2021 | Mathew | G06N 3/048 |
| 2022/0044109 | A1* | 2/2022 | Donnelly | G06N 3/04 |
| 2023/0055313 | A1* | 2/2023 | Cao | G06V 10/28 |

OTHER PUBLICATIONS

Kuan Wang, Zhijian Liu, Yujun Lin, Ji Lin, and Song Han, "HAQ: Hardware-Aware Automated Quantization with Mixed Precision" (Year: 2019).*

Krishnamoorthi, Raghuraman, "Quantizing deep convolutional networks for efficient inference: A whitepaper" Jun. 2018, (36p).

* cited by examiner

SYSTEMS AND METHODS FOR QUANTIZATION AWARE TRAINING OF A NEURAL NETWORK FOR HETEROGENEOUS HARDWARE PLATFORM

FIELD

The present application generally relates to quantization aware training of a neural network, and in particular but not limited to, systems and methods for quantization aware training of a neural network for heterogeneous hardware platform.

BACKGROUND

Quantization, as one of the most widely used tools for reducing size of AI model and accelerating AI inference time, is critical for both cloud and edge computing. In particular, the increasing diversity of various hardware platforms in recent years and the rapidly increasing computational cost of deep learning-based models call for efficient and accurate quantization methods.

Since supporting all quantization methods would be too costly and ineffective, most hardware vendors support only one or few quantization configurations that are best suited for their hardware platforms. That is, if an incompatible or suboptimal quantization configuration is used, it can result in a significant loss of accuracy and reduce the performance gain of running the model on a specific hardware. Therefore, it is desired to apply quantized models to different heterogeneous hardware platforms while still maintaining accuracy.

SUMMARY

In general, this disclosure describes examples of techniques relating to determining a quantization configuration for performing quantization-aware training of a neural network that is supported by or preferred for a heterogeneous hardware platform, such that the output network model can be best suited for that heterogeneous hardware platform.

According to a first aspect of the present disclosure, there is provided a quantization aware training (QAT) method of a neural network. The QAT method includes acquiring hardware profiles with respect to a plurality of hardware components of a heterogeneous hardware platform. The QAT method further includes determining a plurality of hardware configurations based on the hardware profiles. The QAT method further includes acquiring a set of training data and performing a quantization aware training using the training data on a network model based on the hardware configurations. The QAT method further includes obtaining the network model with model weights for the heterogeneous hardware platform.

According to a second aspect of the present disclosure, there is provided a QAT system. The QAT system includes at least one computer storage memory operable to store data along with computer-executable instructions. The QAT system further includes at least one processor operable to read the data and operate the computer-executable instructions to acquire hardware profiles with respect to a plurality of hardware components of a heterogeneous hardware platform. The at least one processor is further operable to determine a plurality of hardware configurations based on the hardware profiles. The at least one processor is further operable to acquire a set of training data and perform a quantization aware training using the training data on a network model based on the hardware configurations. The at least one processor is further operable to output the network model with model weights for the heterogeneous hardware platform.

According to a third aspect of the present disclosure, there is provided a non-transitory computer readable medium having stored thereon a program for performing a method of quantization aware training. The method includes acquiring hardware profiles with respect to a plurality of hardware components of a heterogeneous hardware platform. The method further includes determining a plurality of hardware configurations based on the hardware profiles. The method further includes acquiring a set of training data and performing a quantization aware training using the training data on a network model based on the hardware configurations. The method further includes obtaining the network model with model weights for the heterogeneous hardware platform.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1:
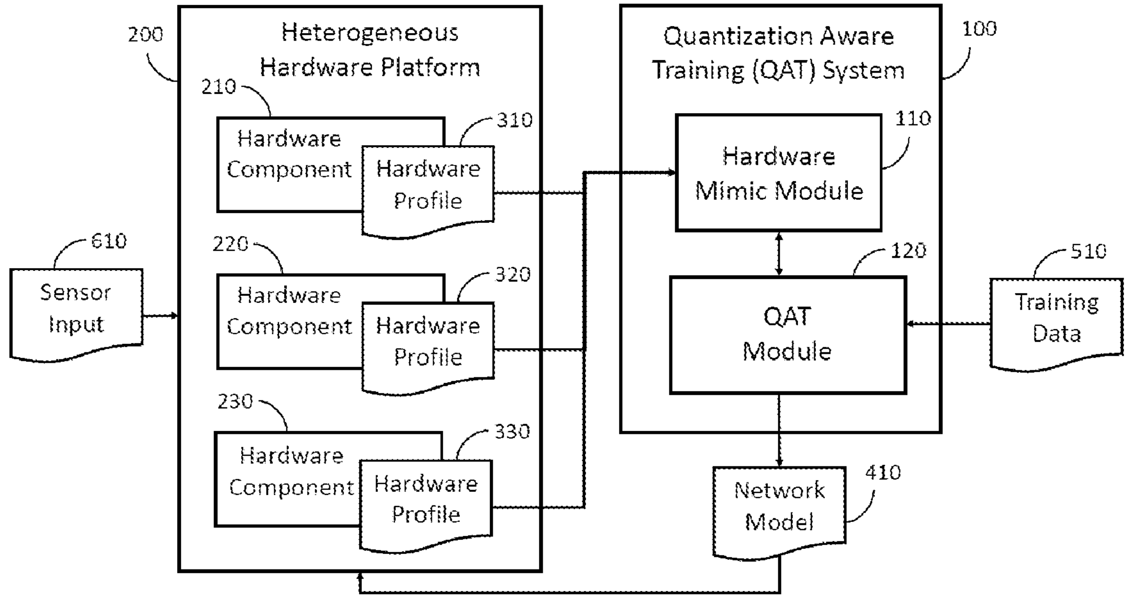
FIG. 1 is a block diagram illustrating an exemplary QAT of a neural network for heterogeneous hardware platform with some embodiments of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," and etc. are all used as nomenclature only for references to relevant elements, e.g. devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may include steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a block diagram illustrating an exemplary QAT of a neural network for heterogeneous hardware platform with some embodiments of the present disclosure. As shown in FIG. 1, a heterogeneous hardware platform 200 may include a plurality of hardware components 210-230, each with its own hardware profile. For example, the heterogeneous hardware platform 200 includes a first hardware profile 310 along with a first hardware component 210, a second hardware profile 320 along with a second hardware component 220, and a third hardware profile 330 along with a third hardware component 230. The QAT system 100 may include a hardware mimic module 110 and a QAT module 120. In some embodiments, the heterogeneous hardware platform 200 and the QAT system 100 may work based on separate hardware devices, such as separate processors, memory units, storage units, etc. In other embodiments, the heterogeneous hardware platform 200 and the QAT system 100 may work on the basis of all or partly shared hardware devices.

The hardware components 210-230 may include processors, integrated circuits, programmable logic devices (PLD), field programmable gate arrays (FPGA), etc. For example, the processors can be selected from one or more of central processing unit (CPU), graphics processing unit (GPU), tensor processing unit (TPU), neural network processing unit (NPU), microprocessor/micro controller unit (MPU/MCU), and digital signal processor/processing devices (DSP/DSPD). For example, the integrated circuits can be standard logic integrated circuits (standard logic IC) or application specific integrated circuits (ASIC). In some embodiments, the hardware components 210-230 are CPU, GPU, and ASIC respectively.

The hardware profiles 310-330 may be associated with the hardware components 210-230 respectively. For example, the hardware profiles 310-330 can include performance data with respect to their hardware components respectively. The performance data may be selected from one or more of following parameters: throughput (i.e., the amount of processed data in a predetermined amount of time), latency (i.e., a measure of time delay), power consumption (i.e., actual electric energy requirements), cost (e.g., the purchase cost or computational cost of the associated hardware devices), and so on. In some embodiments, the hardware profiles 310-330 include the throughput and/or latency of the CPU, GPU, and ASIC, respectively. In addition to the performance data, in some examples, the hardware profiles 310-330 may also include one or more quantization configurations supported by the by the hardware components 210-230 respectively.

The performance data of the hardware profiles 310-330 may include a variety of data corresponding to the execution of different types of neural networks, such as artificial neural networks (ANN), convolution neural networks (CNN), recurrent neural networks (RNN), and so on. In some embodiments, the hardware profiles 310-330 correspond to the throughput and/or latency of the CPU, GPU and ASIC performing a predefined neural network respectively.

As shown in FIG. 1, the QAT system 100 may include the hardware mimic module 110 and the QAT module 120. The hardware mimic module 110 is to mimic hardware settings of the heterogeneous hardware platform 200, and introduce such settings into the quantization aware training such that the trained network models can be better adapted to the heterogeneous hardware platform 200. The hardware mimic module 110 may acquire the hardware profiles 310-330 with respect to the hardware components 210-230 of the heterogeneous hardware platform 200. For example, the hardware mimic module 110 acquires the hardware profiles 310-330 corresponding to the hardware components 210-230 respectively from the heterogeneous hardware platform 200 via Internet communication. In some embodiments, the hardware mimic module 110 obtains information of the throughput and/or latency of the CPU, GPU and ASIC performing the predefined neural network contained in the hardware profiles 310-330 from the heterogeneous hardware platform 200.

After that, the hardware mimic module 110 may determine a plurality of hardware configurations based on the hardware profiles. In some embodiments, the hardware configurations are determined based on: (1) selecting a computational component from the hardware components 210-230 for each layer of the quantization aware training based on the hardware profiles 310-330, and (2) generating the hardware configurations associated with the selected computational component with respect to performing the predefined neural network based on the hardware profile. For example, the hardware mimic module 110 selects the first hardware component 210 as the computational component for certain layers of quantization aware training and then extract information, such as the one or more quantization configurations supported by the first hardware component 210 for performing the predefined neural network, from the first hardware profile 310 to form the hardware configurations. In other embodiments, the hardware configurations are determined based on: (1) selecting a computational component from the hardware components 210-230 for each layer of the quantization aware training based on the hardware profiles 310-330, (2) determining a computing precision for each layer of the quantization aware training based on the hardware profiles 310-330, and (3) generating the hardware configurations associated with the selected computational component and the determined computing precisions with respect to performing the predefined neural network based on the hardware profile corresponding to the selected computational component. Therefore, the hardware configurations may include the one or more quantization configurations supported or preferred by the selected computational component for performing the predefined neural network, and may also include a plurality of computing precisions, such as INT4 (4-bit integer data), INT8, INT16, FP16 (16-bit float point data), BF16 (16-bit brain floating point data, including 8 exponent bits and 7 fraction bits), FP32, FP64, and so on, with respect to performing each layer of the quantization aware training.

The QAT module 120 may acquire a set of training data 510 and perform a quantization aware training using the training data 510 on one or more network models based on the hardware configurations determined by the hardware mimic module 110. For example, the training data 510 is a dataset that represents the real data in the production environment. In some embodiments, the training data 510 may be a calibration dataset.

The quantization aware training may be performed by a quantization scheme together with a training procedure (e.g., a quantized inference framework and a quantized training framework) to preserve end-to-end model accuracy post quantization. The quantization scheme may be implemented using integer-only arithmetic during inference and floating-point arithmetic during training, with both implementations maintaining a high degree of correspondence with each other. That is, the quantization scheme allows inference to be carried out using integer-only arithmetic. Preferably, the data type used in the quantization aware training may be lower-precision (i.e., no more than 16 bits) datatype other then integer, such as BF16 (16-bit brain floating data) including 1 sign bit, 8 exponent bits, and 7 fraction bits or other custom defined lower-precision data type.

The quantization aware training may be performed based on the information contained in the hardware configurations. In some embodiments, the quantization aware training may be performed based on the quantization configurations supported by the selected computational component for performing the predefined neural network. For example, in the case where the hardware mimic module 110 selected the first hardware component 210 as the computational component, the QAT module 120 performs a quantization aware training using the training data 510 on the one or more network models based on the hardware configurations including the one or more quantization configurations supported by the selected computational component, that is the first hardware component 210 in this example, for performing the predefined neural network. In some embodiments, the quantization aware training may be performed based on the computing precisions for each layer along with the quantization configurations supported by the computational component for performing the predefined neural network. In some embodiments, the QAT module 120 may adopt the hardware configurations along with one or more float models for fine-tunning on model weights and/or activations of the one or more network models 410. The one or more float models may, but not limited to, be a 32-bit float point data (FP32) model for initialization.

After performing the quantization aware training, the QAT module 120 may output the trained one or more network models 410 with model weights, where the trained one or more network models 410 may be able to handle different precision for different layer, for the heterogeneous hardware platform 200. The QAT module 120 may then send the one or more network models 410 to the heterogeneous hardware platform 200 for evaluation and/or execution. For example, in the case where the hardware mimic module 110 selects the second hardware component 220 (here a specific GPU is used as an example) as the computational component, the one or more network models 410 together with its model weights are specifically trained using the quantization configurations compatibly or preferably supported by such GPU to perform the predefined neural network with the computing precisions for each layer.

After receiving the one or more network models 410, the heterogeneous hardware platform 200 may perform the one or more network models 410 with the sensor input 610. The sensor input 610 may come from one or more sensors, such as image or optical sensors (e.g., CMOS or CCD image sensor), an acceleration sensor, a gyroscope sensor, an orientation sensor, a magnetic sensor, a pressure sensor, a proximity sensor, a position sensor, temperature sensor, a voice/acoustic sensor, or a user input device (e.g., keypad).

Optionally, the one or more network models 410 may be evaluated and fine-tunned before being actually performed on the heterogeneous hardware platform 200. For example, after receiving the one or more network models 410 from the QAT system 100, the heterogeneous hardware platform 200 can evaluate the one or more network models 410 by executing a test data set to obtain an evaluation result. After that, the QAT system 100 may use the evaluation result to adjust the hardware configurations, retrain the quantization aware training, and output an updated one or more network models for another evaluation or execution. In some embodiments, the QAT system 100 may use the evaluation result to fine-tune on model weights and/or activations of the one or more network models 410.

Figure 2:
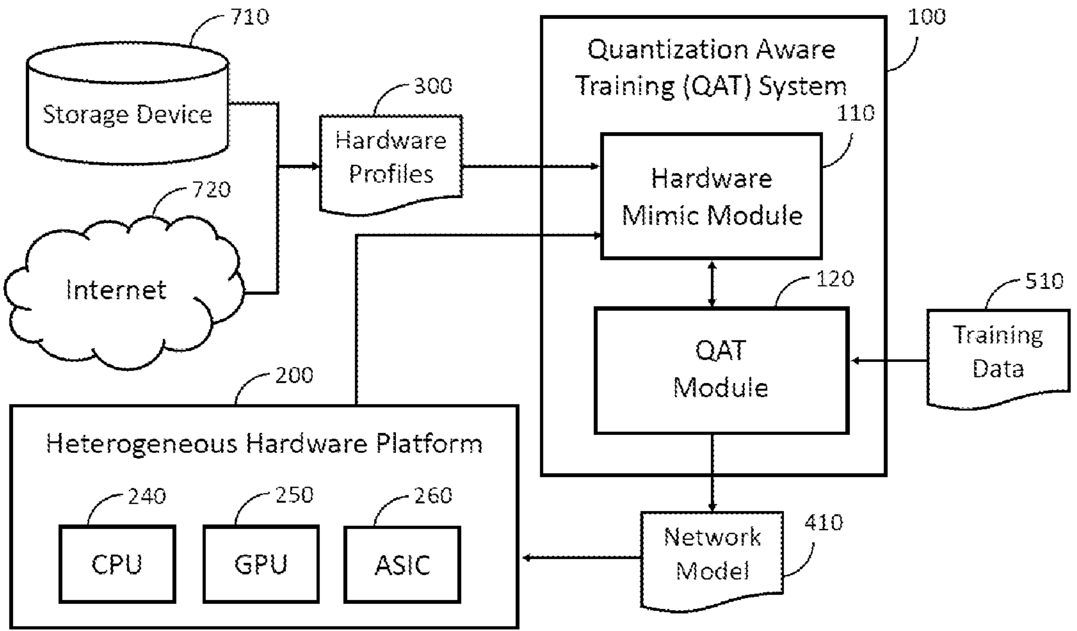
FIG. 2 is a block diagram illustrating an exemplary quantization aware training of a neural network for heterogeneous hardware platform with some embodiments of the present disclosure.

FIG. 2 is a block diagram illustrating an exemplary quantization aware training of a neural network for heterogeneous hardware platform with some embodiments of the present disclosure. As shown in FIG. 2, the hardware profiles 300 may be obtained locally from a storage device 710 and/or remotely from the Internet 720. In some embodiments, the hardware mimic module 110 of the QAT system 100 acquires information about the hardware components, such as type or model number of CPU/GPU/ASIC, used by the heterogeneous hardware platform 200, where the information can come directly from the heterogeneous hardware platform 200, or from the storage device 710, or from the Internet 720, or entered by users. After acquiring the information about the hardware components used by the heterogeneous hardware platform 200, the hardware mimic module 110 may look up the corresponding hardware profiles 300 from the storage device 710 or the Internet 720. For example, the hardware mimic module 110 acquires the information indicating that the heterogeneous hardware platform 200 contains CPU 240, GPU 250, and ASIC 260, and then the hardware mimic module 110 sends a query to the storage device 710 or the Internet 720 to find the hardware profiles 300 corresponding to the CPU 240, GPU 250, and ASIC 260.

The storage device 710 may be a non-transitory computer readable storage medium, such as a Hard Disk Drive (HDD), a Solid-State Drive (SSD), Flash memory, a Hybrid Drive or Solid-State Hybrid Drive (SSHD), a magnetic tape, a floppy disk and etc. In some embodiments, the storage device 710 may be a Read-Only Memory (ROM), such as an Electrically Erasable Programmable Read-Only Memory (EEPROM), an Erasable Programmable Read-Only Memory (EPROM), a Programmable Read-Only Memory (PROM), and a Disc based Read-Only Memory (CD-ROM/DVD-ROM/Blu-ray-Disc). In some embodiments, the storage device 710 may be a remote server, such as a blade server or a rack server, including one or more the non-transitory computer readable storage mediums and/or the Read-Only Memory (ROM) mentioned above.

Figure 3:
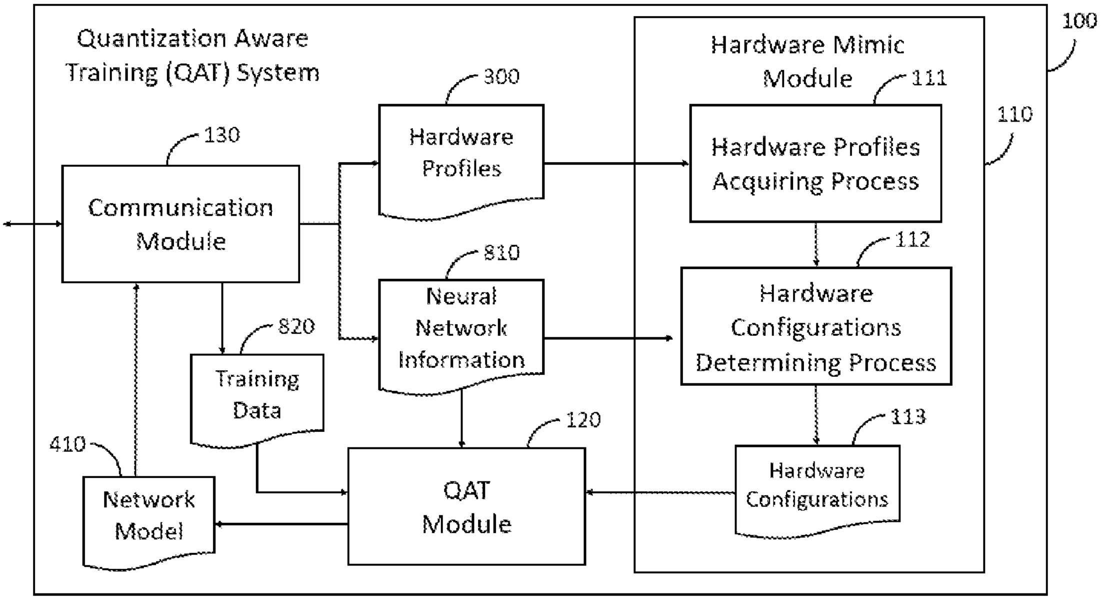
FIG. 3 is a block diagram illustrating an exemplary QAT system with some embodiments of the present disclosure.

FIG. 3 is a block diagram illustrating an exemplary QAT system with some embodiments of the present disclosure. As shown in FIG. 3, the QAT system 100 may include a communication module 130, a hardware mimic module 110, and a QAT module 120 to perform quantization aware training of a neural network and output one or more network models 410 that is better adapted to the heterogeneous hardware platform.

The communication module 130 may communicate with one or more information source to obtain hardware profile 300 and neural network information 810. For example, the communication module 130 obtains the hardware profile 300 corresponding to hardware components contained in a heterogeneous hardware platform from a first remote database. For example, the communication module 130 also obtains the neural network information 810, such as type and training configurations of the neural network, from a second remote database.

The hardware profile 300 may include performance data with respect to corresponding hardware components contained in the heterogeneous hardware platform. In some embodiments, the performance data is selected from one or more of following parameters: throughput (i.e., the amount of processed data in a predetermined amount of time), latency (i.e., a measure of time delay), power consumption (i.e., actual electric energy requirements), cost (e.g., the purchase cost or computational cost of the associated hardware devices), and so on of processing units such as CPU, GPU, and ASIC with respect to performing a predefined neural network. In some embodiments, the hardware profile 300 includes one or more quantization configurations supported by the hardware components contained in the heterogeneous hardware platform.

The hardware mimic module 110 may include a hardware profile acquiring process 111 to obtain the hardware profile 300 from the communication module 130, and a hardware configuration determining process 112 to determine hardware configurations 113 based on the hardware profiles. In some embodiments, the hardware configurations 113 are determined based on: (1) selecting a computational component from the hardware components contained in the heterogeneous hardware platform for each layer of the quantization aware training based on the hardware profile 300, and (2) generating the hardware configurations associated with the selected computational component with respect to performing the predefined neural network based on the hardware profile. For example, the hardware configuration determining process 112 selects a GPU contained in the heterogeneous hardware platform as the computational component for performing certain layers of QAT, and the hardware configuration determining process 112 then extract information, such as the one or more quantization configurations supported by such selected GPU for performing the predefined neural network, from the hardware profile 300 to form the hardware configurations 113.

The QAT system 100 may determine a computing precision for each layer that performs the quantization aware training with respect to the predefined neural network, where the computing precisions may be chosen from INT4 (4-bit integer data), INT8, INT16, FP16 (16-bit float point data), BF16 (16-bit brain floating point data, including 8 exponent bits and 7 fraction bits), FP32, FP64, and etc. In some embodiments, such computing precision determining process can be based on the hardware profile 300.

The QAT module 120 may acquire a set of training data 510 from the communication module 130 and perform a quantization aware training using the training data 510 on one or more network models based on the hardware configurations 113 with the computing precisions. For example, the quantization aware training may be performed by the QAT module 120 with the training data 510 based on the quantization configurations that are supported by the selected computational component with respect to performing the predefined neural network. In some embodiments, the QAT module 120 may adopt the hardware configurations 113 and the computing precisions along with one or more float models to perform the quantization aware training such that the model weights and/or activations of the one or more network models 410 can be fine-tunned.

The QAT module 120 may then send the trained one or more network models 410 to the communication module 130, so that the QAT system 100 can send the one or more network models 410 to the heterogeneous hardware platform through the communication module 130.

Figure 4:
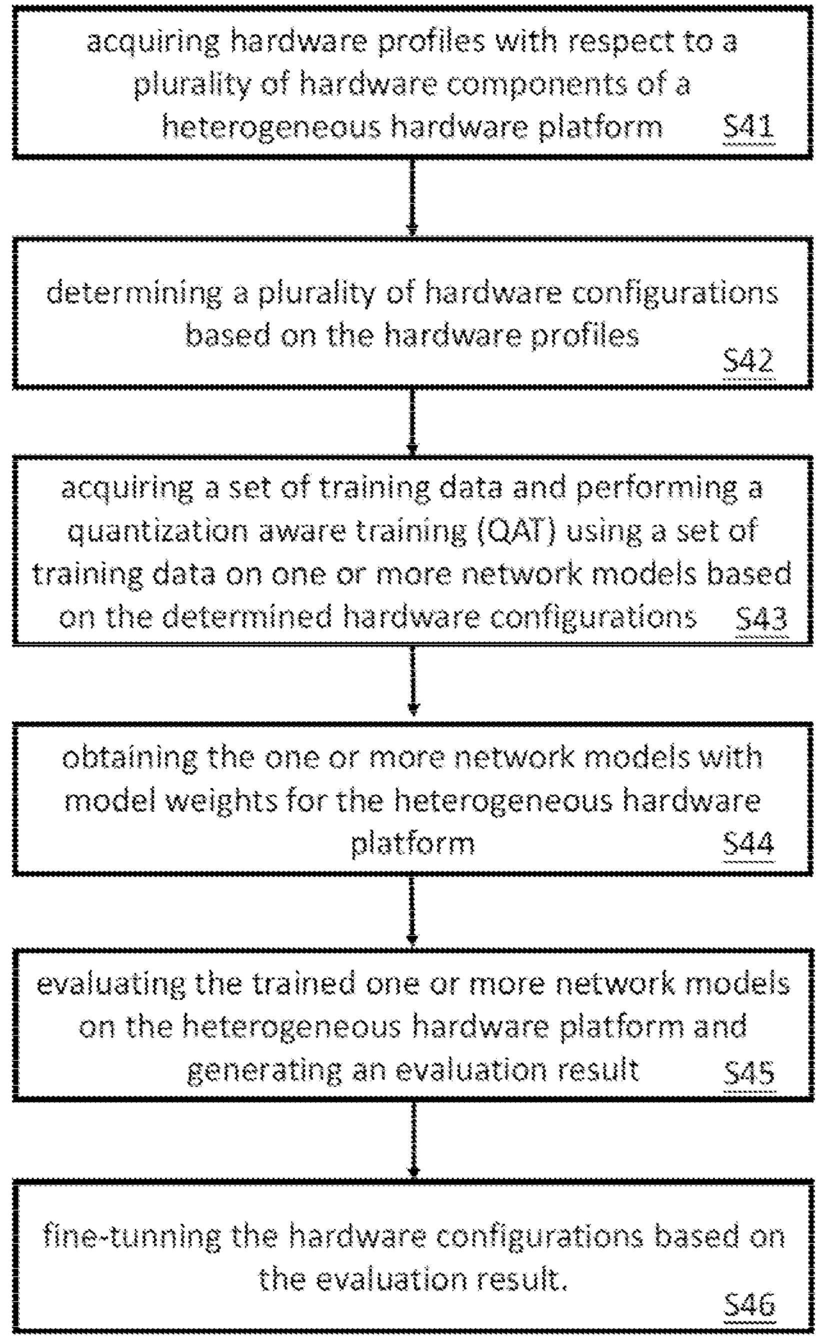
FIG. 4 is a flowchart illustrating some exemplary method steps for implementing quantization aware training in accordance with some embodiments of the present disclosure.

FIG. 4 is a flowchart illustrating some exemplary method steps for implementing quantization aware training in accordance with some embodiments of the present disclosure. As shown in FIG. 4, step S41 includes acquiring hardware profiles with respect to a plurality of hardware components of a heterogeneous hardware platform. In some embodiments, the hardware profiles may include performance data with respect to corresponding hardware components contained in the heterogeneous hardware platform. The performance data may include throughput (i.e., the amount of processed data in a predetermined amount of time), latency (i.e., a measure of time delay), power consumption (i.e., actual electric energy requirements), and/or cost (e.g., the purchase cost or computational cost of the associated hardware devices). In some embodiments, the hardware profile includes a plurality of quantization configurations supported or preferred by the hardware components with respect to performing different type of neural networks. In some embodiments, the hardware profile includes a plurality of computing precisions supported or preferred by the hardware components with respect to performing different type of neural networks.

Step S42 includes determining a plurality of hardware configurations based on the hardware profiles. For example, a computational component may be determined based on the performance data of the previous step, e.g., selecting a hardware component with higher throughput and lower latency among others with respect to performing a predefined neural network as the computational component. After that, generating the hardware configurations, such as the one or more quantization configurations supported by the computational component for performing the predefined neural network, based on the information contained in the hardware profiles.

Step S43 includes acquiring a set of training data and performing a quantization aware training using a set of training data on one or more network models based on the determined hardware configurations. For example, the hardware configurations and one or more computing precisions can be adopted along with one or more float models to perform the quantization aware training such that model weights and/or activations of the one or more network models may be fine-tunned. Further, step S44 includes obtaining the one or more network models with the model weights for the heterogeneous hardware platform.

Step S45 includes evaluating the trained one or more network models on the heterogeneous hardware platform and obtaining an evaluation result. Step S46 includes fine-tunning the hardware configurations based on the evaluation result. For example, after receiving the one or more network models, the heterogeneous hardware platform may evaluate the one or more network models by executing a test data set to obtain an evaluation result before being actually performed on the heterogeneous hardware platform. After that, the evaluation result may be used to adjust the hardware configurations, perform the quantization aware training again, and output updated one or more network models for another evaluation or execution. In some embodiments, the evaluation result may be used to fine-tune on the model weights and/or activations of the one or more network models.

Figure 5:
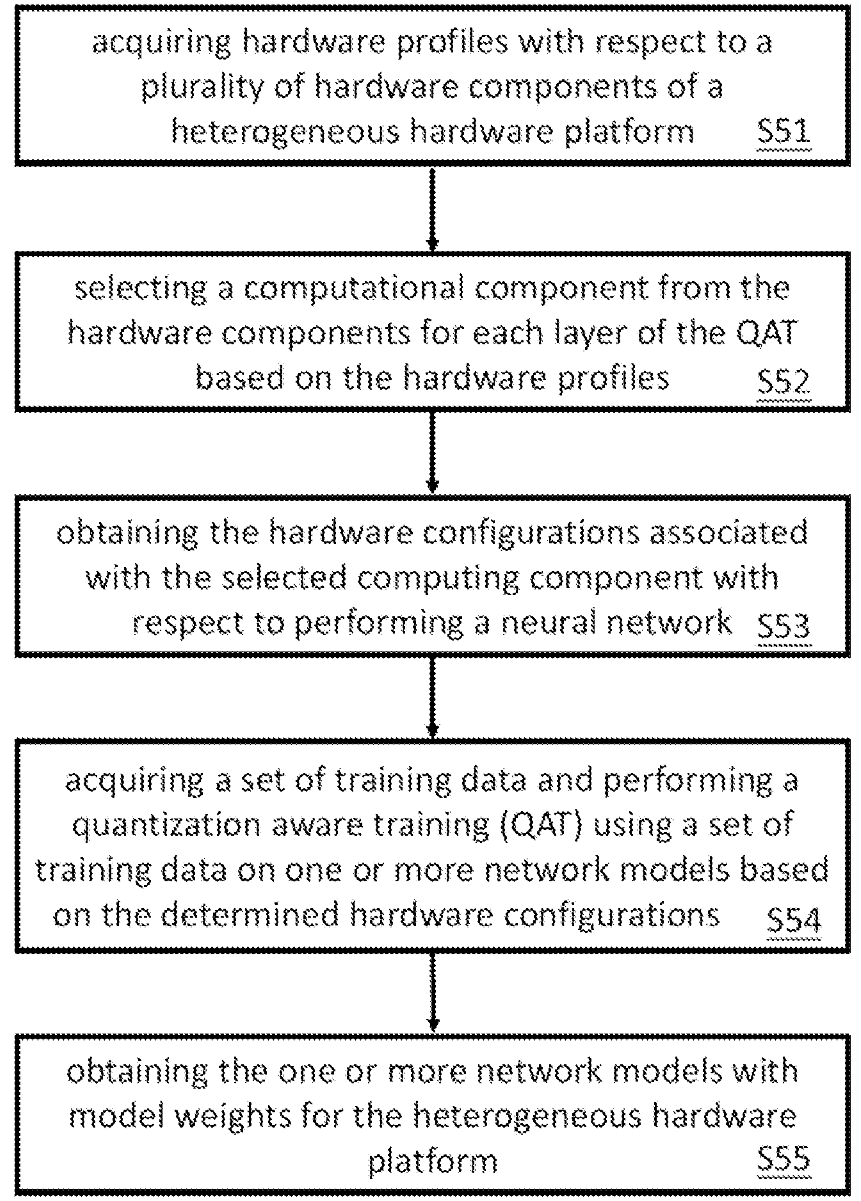
FIG. 5 is a flowchart illustrating some exemplary method steps for implementing quantization aware training in accordance with some embodiments of the present disclosure.

FIG. 5 is a flowchart illustrating some exemplary method steps for implementing quantization aware training in accordance with some embodiments of the present disclosure. As shown in FIG. 5, step S51 includes acquiring hardware profiles with respect to a plurality of hardware components of a heterogeneous hardware platform.

Step S52 includes selecting a computational component from the hardware components for each layer of the quantization aware training based on the hardware profiles. For example, the computational component may be selected based on one or more performance data, such as throughput (i.e., the amount of processed data in a predetermined amount of time), latency (i.e., a measure of time delay), power consumption (i.e., actual electric energy requirements), and/or cost (e.g., the purchase cost or computational cost of the associated hardware devices), of the hardware components.

Step S53 includes obtaining the hardware configurations associated with the selected computational component with respect to performing a predefined neural network. In some embodiments, the hardware configurations may include the one or more quantization configurations supported or preferred by the selected computational component for performing the predefined neural network, and may also include a plurality of computing precisions, such as INT4 (4-bit integer data), INT8, INT16, FP16 (16-bit float point data), BF16 (16-bit brain floating point data, including 8 exponent bits and 7 fraction bits), FP32, FP64, and so on, with respect to performing each layer of the quantization aware training.

Step S54 includes acquiring a set of training data and performing a quantization aware training using a set of training data on one or more network models based on the determined hardware configurations. Further, step S55 includes obtaining the one or more network models with model weights for the heterogeneous hardware platform.

Figure 6:
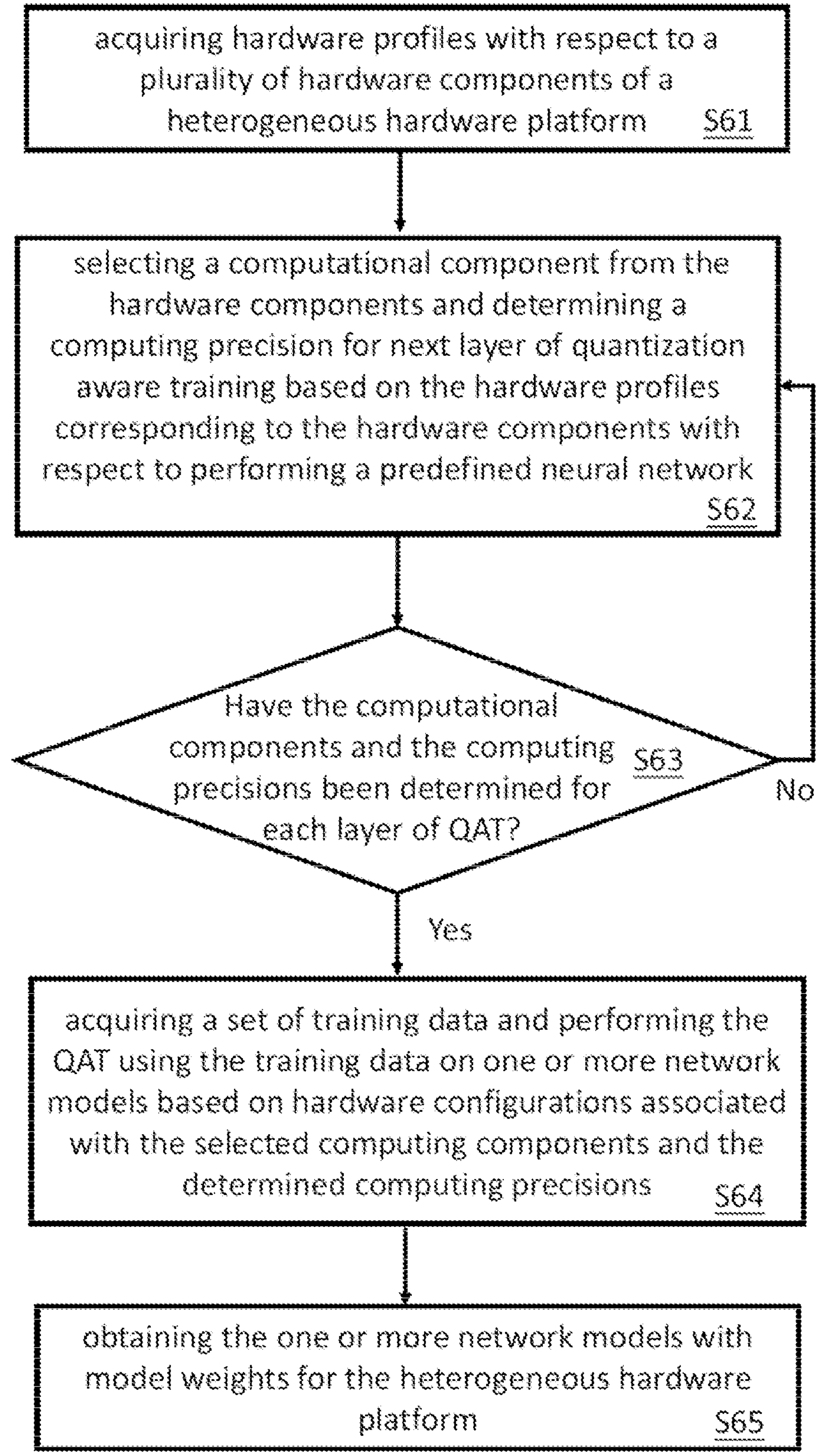
FIG. 6 is a flowchart illustrating some exemplary method steps for implementing quantization aware training in accordance with some embodiments of the present disclosure.

FIG. 6 is a flowchart illustrating some exemplary method steps for implementing quantization aware training in accordance with some embodiments of the present disclosure. As shown in FIG. 6, step S61 acquiring hardware profiles with respect to a plurality of hardware components of a heterogeneous hardware platform.

Step S62 includes selecting a computational component from the hardware components and determining a computing precision for next layer of quantization aware training based on the hardware profiles corresponding to the hardware components with respect to performing a predefined neural network.

Step S63 includes checking if the computational components and the computing precisions have been determined for each layer of quantization aware training. In the negative case when computational components and the computing precisions have not been determined, the process goes back to step S62 to select a computational component and determine a computing precision for next layer of the quantization aware training based on the hardware profiles. In the positive case when computational components and the computing precisions for each layer have been determined, acquiring a set of training data and performing the quantization aware training using the training data on one or more networks model based on hardware configurations associated with the selected computing components and the determined computing precisions (step S64). Further, step S65 includes obtaining the one or more network models with model weights for the heterogeneous hardware platform.

Advantages of mimicking hardware settings of a heterogeneous hardware platform and introduce such settings into a quantization aware training (e.g., determining hardware configurations based on hardware profiles corresponding to hardware components of a heterogeneous hardware platform, and then performing the quantization aware training based on the determined hardware configurations) are, but not limited to, the trained one or more network models can be better adapted to the heterogeneous hardware platform with a guarantee of minimizing accuracy loss. That is, with many heterogeneous hardware platforms emerged that showing a promising low latency and high throughput, the present disclosure combines the advantage of these heterogeneous hardware platforms with quantized one or more network models without at the cost of accuracy. Thus, the disclosed methods achieve a lossless transition between different heterogeneous hardware platforms currently in use and enable a fast and reliable transition to any possible future heterogeneous hardware platform for the predefined neural network.

Figure 7:
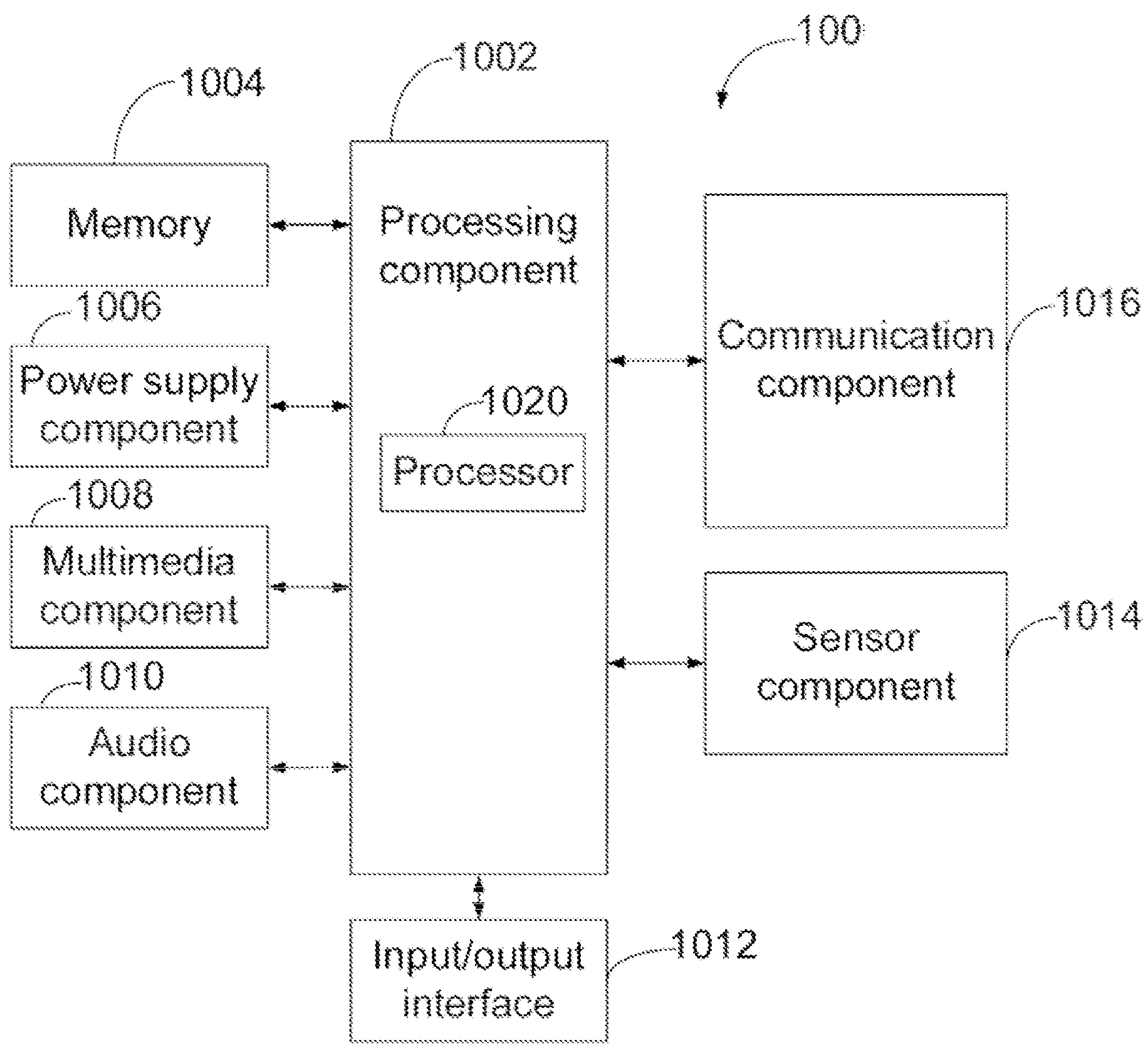
FIG. 7 is a block diagram illustrating a QAT system in accordance with some embodiments of the present disclosure.

FIG. 7 is a block diagram illustrating a QAT system in accordance with some embodiments of the present disclosure. As shown in FIG. 7, the QAT system 100 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 usually controls overall operations of the QAT system 100, such as operations relating to display, a telephone call, data communication, a camera operation and a recording operation. The processing component 1002 may include one or more processors 1020 for executing instructions to complete all or a part of steps of the above method. Further, the processing component 1002 may include one or more modules to facilitate interaction between the processing component 1002 and other components. For example, the processing component 1002 may include a multimedia module to facilitate the interaction between the multimedia component 1008 and the processing component 1002.

The memory 1004 is configured to store different types of data to support operations of the QAT system 100. Examples of such data include instructions, contact data, phonebook data, messages, pictures, videos, and so on for any application or method that operates on the QAT system 100. The memory 1004 may be implemented by any type of volatile or non-volatile storage devices or a combination thereof, and the memory 1004 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1006 supplies power for different components of the QAT system 100. The power supply component 1006 may include a power supply management system, one or more power supplies, and other components associated with generating, managing and distributing power for the QAT system 100.

The multimedia component 1008 includes a screen providing an output interface between the QAT system 100 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1008 may include a front camera and/or a rear camera. When the QAT system 100 is in an operation mode, such as a shooting mode or a video mode, the front camera and/or the rear camera may receive external multimedia data.

The audio component 1010 is configured to output and/or input an audio signal. For example, the audio component 1010 includes a microphone (MIC) configured to receive an external audio signal. The received audio signal may be further stored in the memory 1004 or sent via the communication component 1016. In some examples, the audio component 1010 further includes a speaker for outputting an audio signal.

The I/O interface 1012 provides an interface between the processing component 1002 and a peripheral interface module. The above peripheral interface module may be a keyboard, a click wheel, a button, or the like. These buttons may include but not limited to, a home button, a volume button, a start button and a lock button.

The sensor component 1014 includes one or more sensors for providing a state assessment in different aspects for the QAT system 100. For example, the sensor component 1014 may detect an on/off state of the QAT system 100 and relative locations of components. For example, the components are a display and a keypad of the QAT system 100. The sensor component 1014 may also detect a position change of the QAT system 100 or a component of the QAT system 100, presence or absence of a contact of a user on the QAT system 100, an orientation or acceleration/deceleration of the QAT system 100, and a temperature change of QAT system 100. The sensor component 1014 may include a proximity sensor configured to detect presence of a nearby object without any physical touch. The sensor component 1014 may further include an optical sensor, such as a CMOS or CCD image sensor used in an imaging application. In some examples, the sensor component 1014 may further include an acceleration sensor, a gyroscope sensor, a magnetic sensor, a pressure sensor, or a temperature sensor.

The communication component 1016 is configured to facilitate wired or wireless communication between the QAT system 100 and other devices. For example, the QAT system 100 may access a wireless network based on a communication standard, such as WiFi, 4G, or a combination thereof through the communication component 1016, such as wired or wireless Ethernet network card. For another example, the communication component 1016 receives a broadcast signal or broadcast related information from an external broadcast management system via a broadcast channel. For another example, the communication component 1016 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the QAT system 100 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method of performing quantization aware training (QAT) of a neural network, comprising:

acquiring hardware profiles with respect to a plurality of hardware components of a heterogeneous hardware platform, wherein the hardware profiles comprise performance data associated with the execution of different types of neural networks;

determining hardware configurations based on the performance data without imposing architecture constraints by:

selecting a computational component from the hardware components for each layer of the quantization aware training based on the hardware profiles comprising the performance data;

determining a computing precision for each layer of the quantization aware training based on the hardware profiles comprising the performance data; and generating the hardware configurations associated with the selected computational component and the determined computing precision with respect to performing the neural network based on the hardware profile corresponding to the selected computational component, wherein the hardware configurations comprise one or more of quantization configurations and a plurality of computing precisions with respect to performing the neural network;

acquiring a set of training data and performing a quantization aware training using the training data on a network model based on the hardware configurations to mimic the hardware configurations of the heterogeneous hardware platform; and obtaining the network model with model weights for the heterogeneous hardware platform based at least in part on the hardware configurations.

2. The method of claim 1, further comprising:

determining whether computational components and computing precisions are determined for each layer of quantization aware training;

in response to determining that the computational component and the computing precision are not determined for one layer of quantization aware training, selecting a computational component and determining a computing precision for a next layer of the quantization aware training based on the hardware profiles comprising the performance data; and in response to determining that the computational component and the computing precision are determined for one layer of quantization aware training, acquiring the set of training data and performing the quantization aware training using the training data on the network model based on the hardware configurations.

3. The method of claim 1, wherein the plurality of computing precisions are determined based on the hardware profiles with respect to performing the neural network.

4. The method of claim 1, wherein the hardware configurations are determined based on:

selecting a computational component and determining a computing precision for each layer of the quantization aware training based on the hardware profiles, wherein the computational component is selected from the hardware components.

5. The method of claim 1, further comprising:

evaluating the trained network model on the heterogeneous hardware platform and obtaining an evaluation result; and fine-tunning the hardware configurations based on the evaluation result.

6. The method of claim 1, wherein the hardware components are one or more selected from central processing unit (CPU), graphics processing unit (GPU), application-specific integrated circuit (ASIC), and field programmable gate array (FPGA).

7. The method of claim 1, wherein the performance data comprise throughput, latency, power consumption, or cost associated with the hardware components of the heterogeneous hardware platform.

8. A quantization aware training (QAT) system, comprising:

at least one computer storage memory operable to store data along with computer-executable instructions; and at least one processor operable to read the data and operate the computer-executable instructions to:

acquiring hardware profiles with respect to a plurality of hardware components of a heterogeneous hardware platform, wherein the hardware profiles comprise performance data associated with the execution of different types of neural networks;

determining hardware configurations based at least in part on the performance data without imposing architecture constraints by:

selecting a computational component from the hardware components for each layer of the quantization aware training based on the hardware profiles comprising the performance data;

determining a computing precision for each layer of the quantization aware training based on the hardware profiles comprising the performance data; and generating the hardware configurations associated with the selected computational component and the determined computing precision with respect to performing the neural network based on the hardware profile corresponding to the selected computational component, wherein the hardware configurations comprise one or more of quantization configurations and a plurality of computing precisions with respect to performing the neural network;

acquiring a set of training data and performing a quantization aware training using the training data on a network model based on the hardware configurations to mimic hardware configurations of the heterogeneous hardware platform; and outputting the network model with model weights for the heterogeneous hardware platform based at least in part on the hardware configurations.

9. The QAT system of claim 8, wherein the at least one processor is further configured to determine whether computational components and computing precisions are determined for each layer of quantization aware training;

in response to determining that the computational component and the computing precision are not determined for one layer of quantization aware training, select a computational component and determine a computing precision for a next layer of the quantization aware training based on the hardware profiles comprising the performance data; and in response to determining that the computational component and the computing precision are determined for one layer of quantization aware training, acquire the set of training data and perform the quantization aware training using the training data on the network model based on the hardware configurations.

10. The QAT system of claim 8, wherein the plurality of computing precisions are determined based on the hardware profiles with respect to performing the neural network.

11. The QAT system of claim 8, wherein the at least one processor is further configured to determine the hardware configurations based on:

selecting a computational component and determining a computing precision for each layer of the QAT based on the hardware profiles, wherein the computational component is selected from the hardware components.

12. The QAT system of claim 8, wherein the at least one processor is further configured to:

evaluating the trained network model on the heterogeneous hardware platform and obtaining an evaluation result; and fine-tunning the hardware configurations based on the evaluation result.

13. The QAT system of claim 8, wherein the hardware components are one or more selected from central processing unit (CPU), graphics processing unit (GPU), application-specific integrated circuit (ASIC), and field programmable gate array (FPGA).

14. The QAT system of claim 8, wherein the performance data comprise throughput, latency, power consumption, or cost associated with the hardware components of the heterogeneous hardware platform.

15. A non-transitory computer readable medium having stored thereon a program for executing a method of performing quantization aware training of a neural network, the method comprising:

acquiring hardware profiles with respect to a plurality of hardware components of a heterogeneous hardware platform, wherein the hardware profiles comprise performance data associated with the execution of different types of neural networks;

determining hardware configurations based at least in part on the performance data without imposing architecture constraints by:

selecting a computational component from the hardware components for each layer of the quantization aware training based on the hardware profiles comprising the performance data;

determining a computing precision for each layer of the quantization aware training based on the hardware profiles comprising the performance data; and generating the hardware configurations associated with the selected computational component and the determined computing precision with respect to performing the neural network based on the hardware profile corresponding to the selected computational component, wherein the hardware configurations comprise one or more of quantization configurations and a plurality of computing precisions with respect to performing the neural network;

acquiring a set of training data and performing a quantization aware training using the training data on a network model based on the hardware configurations to mimic hardware configurations of the heterogeneous hardware platform; and obtaining the network model with model weights for the heterogeneous hardware platform based at least in part on the hardware configurations.

16. The non-transitory computer readable medium of claim 15, wherein the method further comprises determining whether computational components and computing precisions are determined for each layer of quantization aware training;

in response to determining that the computational component and the computing precision are not determined for one layer of quantization aware training, selecting a computational component and determining a computing precision for a next layer of the quantization aware training based on the hardware profiles comprising the performance data; and in response to determining that the computational component and the computing precision are determined for one layer of quantization aware training, acquiring the set of training data and performing the quantization aware training using the training data on the network model based on the hardware configurations.

17. The non-transitory computer readable medium of claim 15, wherein the plurality of computing precisions are determined based on the hardware profiles with respect to performing the neural network.

18. The non-transitory computer readable medium of claim 15, wherein the method further determines the hardware configurations based on:

selecting a computational component and determining a computing precision for each layer of the QAT based on the hardware profiles, wherein the computational component is selected from the hardware components.

19. The non-transitory computer readable medium of claim 15, wherein the method further comprising:

evaluating the trained network model on the heterogeneous hardware platform and obtaining an evaluation result; and fine-tunning the hardware configurations based on the evaluation result.

20. The non-transitory computer readable medium of claim 15, wherein the hardware profiles comprise throughput, latency, power consumption, or cost associated with the hardware components of the heterogeneous hardware platform.

* * * * *